United States Patent

Ayers

[11] Patent Number: 6,154,916
[45] Date of Patent: Dec. 5, 2000

[54] DIRECTIONALLY PIVOTAL FORCED AIR MOTOR VEHICLE CAR WASH DRIER

[76] Inventor: Andrea Ayers, 1941 Grasmere Dr., Apopka, Fla. 32703

[21] Appl. No.: 09/375,185

[22] Filed: Aug. 16, 1999

[51] Int. Cl.$^7$ .................................. A47L 5/38; A47L 5/14
[52] U.S. Cl. ........................... 15/316.1; 15/312.1; 34/366
[58] Field of Search ............................... 15/312.1, 316.1; 34/366

[56] References Cited

U.S. PATENT DOCUMENTS

| | | | |
|---|---|---|---|
| 4,393,602 | 7/1983 | Smith | 34/666 |
| 5,456,023 | 10/1995 | Farnan | 34/666 |
| 5,596,818 | 1/1997 | Jones | 15/316.1 |

Primary Examiner—Terrence R. Till
Assistant Examiner—Theresa T. Snider
Attorney, Agent, or Firm—Michael I Kroll

[57] ABSTRACT

The present invention 10 discloses a device for removing water from the surface of a vehicle as the vehicle emerges from a car wash. Disclosed is an arched conduit 12 having a blower 18 for directing outside atmospheric air therethrough along with a plurality of swiveling air egress members 16 for directing a plurality of streams of high pressure air into the vehicle passageway 22 formed by the conduit arch 12. A plurality of electrically controlled position motors 26 are used to directionally position the air egress members 16 which members swivel by means of a ball socket fixture 38 on their base with means for connecting 24 the position motors to the air egress members 16. Also, the plates 44 of the conduit arch are welded to each other with the welds 46 being covered by a silicon-like material 48.

3 Claims, 10 Drawing Sheets

DIRECTIONALLY PIVOTAL FORCED AIR MOTOR VEHICLE CAR WASH DRIER

BACKGROUND OF THE INVENTION

FIELD OF THE INVENTION

The present invention relates generally to car wash vehicle dryers and, more specifically, to a free standing substantially sealed conduit arch having an external blower injecting atmospheric air into the conduit arch which has means for pivotally directing a plurality of high pressure streams of air into the passageway formed by the conduit arch wherethrough motor vehicles will pass in a final car washing stage to remove the water from said vehicles.

The conduit arch is comprised of a plurality of corner angles and aluminum plates joined by plug-welding one to the other and welding the plates together on the inside having all welds covered by a silicon-like material providing means for maintaining an increased internal atmospheric pressure.

Further said device has a plurality of swiveling forced air egress members providing means for selectively directing a plurality of streams of high pressure air into the passageway formed by the conduit arch.

Each swiveling forced air egress member is comprised of a tubular collar welded over the structural egress apertures. Within each collar is a ball-like socket sleeve providing means for swiveling an air compression nozzle which is affixed to the interior of the ball-like socket sleeve.

In addition a plurality of motors are positional fixed within the conduit arch providing means for pivoting one or more of the forced air egress members. Each of the motors, having electrical connection means, has an orbital member connected by a rigid member to one of the forced air egress members which in turn may be connected by another rigid member to another of the forced air egress members thereby providing means for pivoting one or more of the forced air egress members.

In addition this configuration can limit the number of motors necessary to pivot the forced air egress members to three. One for each stanchion of the conduit arch and one for the overhead member.

SUMMARY OF THE PRESENT INVENTION

The present invention discloses a device for removing water from the surface of a vehicle as the vehicle emerges from a car wash. Disclosed is an arched conduit having a blower for directing outside atmospheric air therethrough along with a plurality of swiveling air egress members for directing a plurality of streams of high pressure air into the vehicle passageway formed by the conduit arch. A plurality of electrically controlled position motors are used to directionally position the air egress members which members swivel by means of a ball socket fixture on their base with means for connecting the position motors to the air egress members. Also, the plates of the conduit arch are welded to each other with the welds being covered by a silicon-like material.

A primary object of the present invention is to provide an improved water removal apparatus for removing the water from motor vehicles as they emerge from a car wash.

Another object of the present invention is to provide an improved water removal apparatus having an external blower injecting atmospheric air into the conduit arch which has means for pivotally directing a plurality of high pressure streams of air into the passageway formed by the conduit arch.

Yet another object of the present invention is to provide a water removal apparatus comprised of a plurality of plug-welded angles and plates and having interior welds covered by a silicon-like material providing means for maintaining an increased internal atmospheric pressure.

Still yet another object of the present invention is to provide an improved water removal apparatus having a plurality of swiveling forced air egress members providing means for selectively directing a plurality of streams of high pressure air into the passageway formed by the water removal apparatus.

Yet another object of the present invention is to provide a forced air egress member comprised of a tubular collar welded over structural egress apertures having a ball-like socket sleeve contained therein.

Another object of the present invention is to provide a forced air egress member comprised of a tubular collar welded over structural egress apertures having a ball-like socket sleeve having a funnel-like member affixed to the interior end.

Yet another object of the present invention is to provide an improved water removal apparatus having a plurality of internal motors providing means for pivoting one or more of the forced air egress members.

Additional objects of the present invention will appear as the description proceeds.

The present invention overcomes the shortcomings of the prior art by providing an improved apparatus for removing the water from a motor vehicle as it emerges from a car wash. Said apparatus having means for increasing the atmospheric pressure within a conduit arch. Also having motorized means for directionally pivoting a plurality of forced air egress members. Further having means for compressing the air before it is ejected into the passageway formed by the conduit arch.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawings in which.

LIST OF REFERENCE NUMERALS

With regard to reference numerals used, the following numbering is used throughout the drawings.

10 present invention
12 conduit arch
14 housing
15 conduit
16 air egress member
18 blower
20 air stream direction arrow
22 vehicle passageway
24 connection means
26 motor
28 stanchion
30 collar
32 apertures
34 means for pivoting
36 second connection means
37 aperture for second connection means
38 socket sleeve
40 nozzle
42 arm
44 plates
46 weld
48 silicon
50 overhead member
52 connection means
54 inner surface
56 outer surface
58 side surface
60 side surface

DESCRIPTION OF THE PREFERRED EMBODIMENT(S)

In order that the invention may be more fully understood, it will now be described, by way of example, with reference to the accompanying drawings in which FIGS. 1 through 10 illustrate the present invention being a device for removing water from motor vehicles as they emerge from a car wash.

Figure 1:
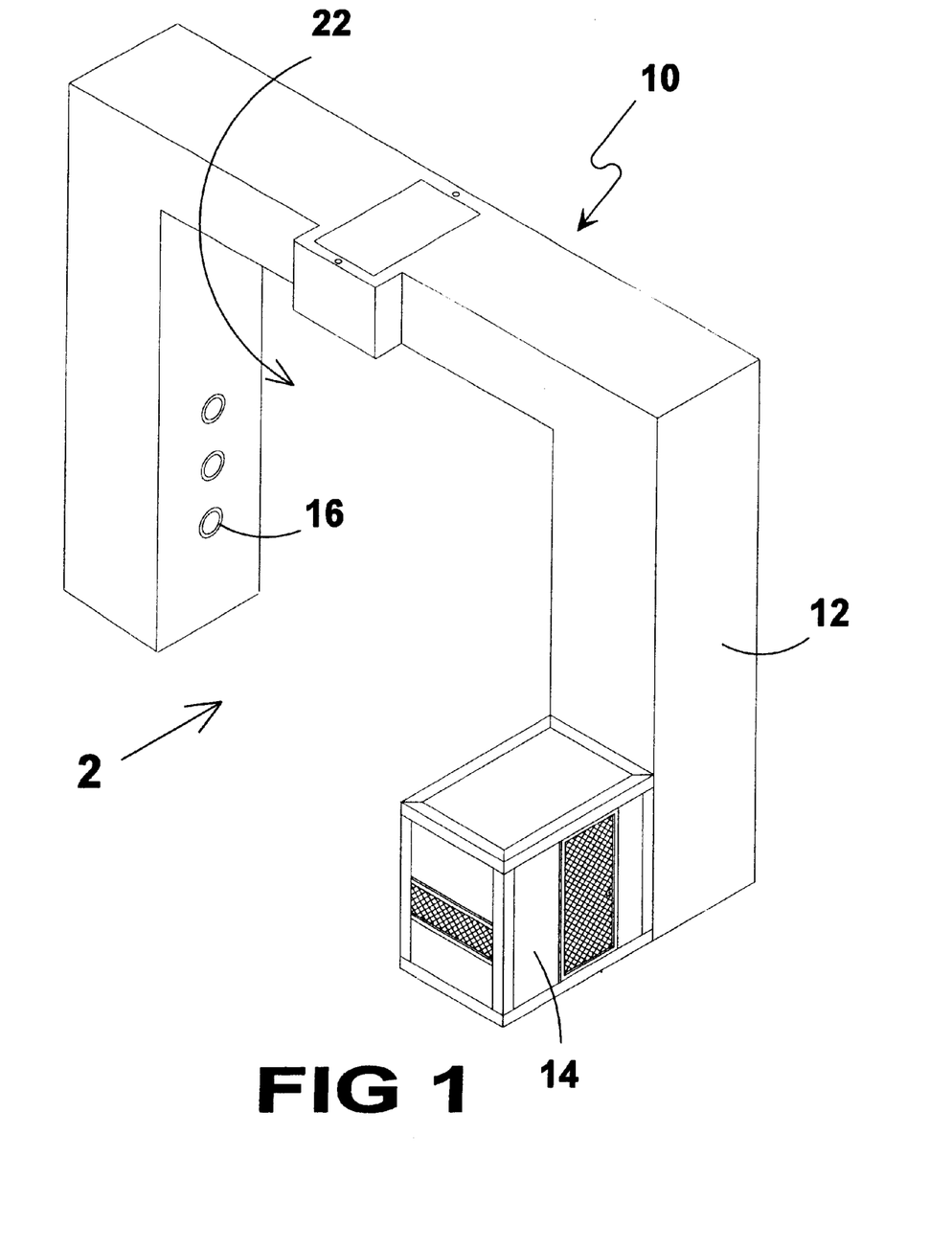
FIG. 1 is a perspective view of the present invention.

Turning to FIG. 1, shown therein is a perspective view of the present invention 10. Shown is a free standing substantially sealed conduit arch 12 having an external blower (not shown), enclosed within a housing 14, injecting atmospheric air into the arch 12. The conduit arch 12 is comprised of a plurality of welded plates and plug-welded corner angles. Also shown is a plurality of swiveling forced air egress members 16 within the vehicle passageway 22 formed by the conduit arch 12.

Figure 2:
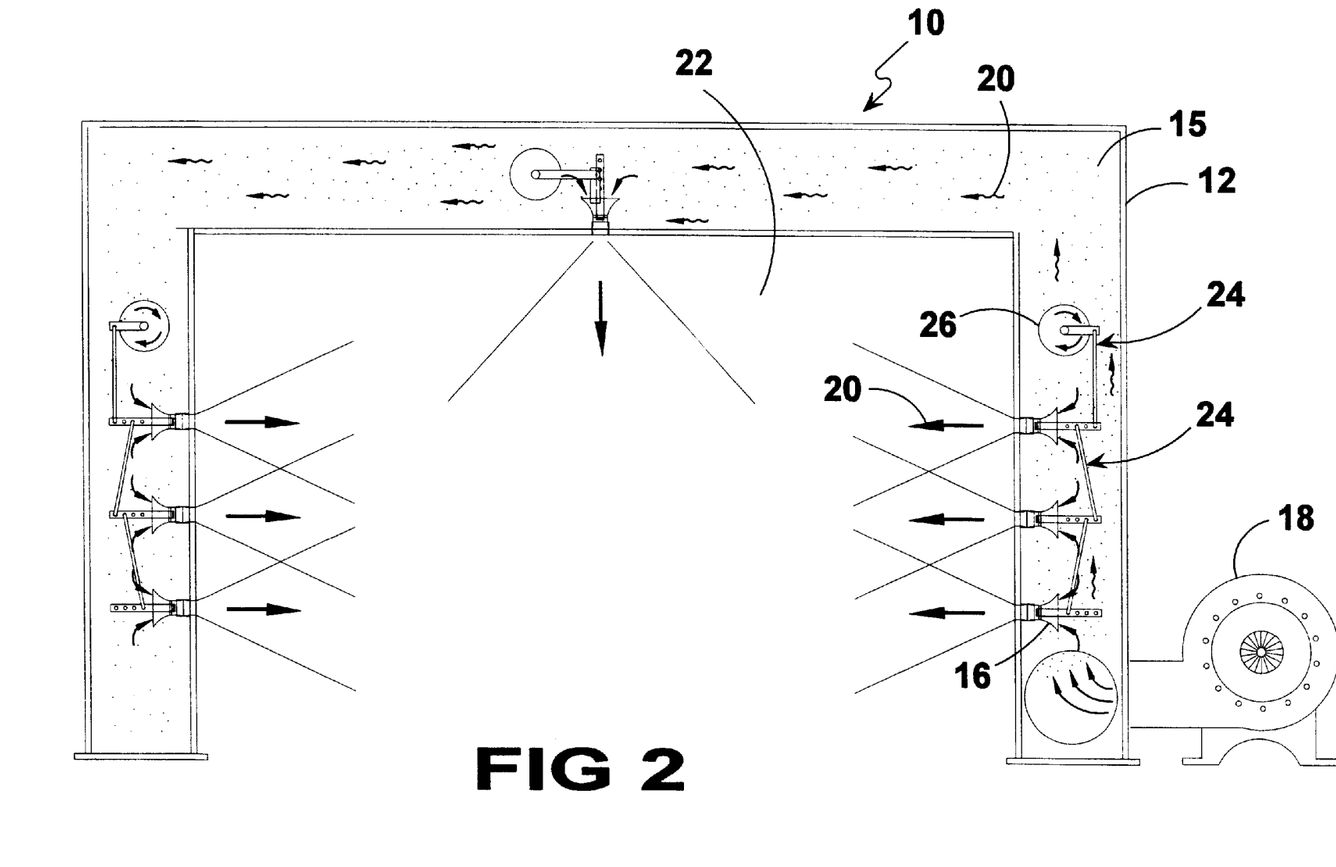
FIG. 2 is a cut away view of the conduit arch of the present invention.

Turning to FIG. 2, shown therein is a cut away view of the conduit 15 of the conduit arch 12 of the present invention 10. Shown is a free standing substantially sealed conduit arch 12 having an external blower 18 injecting atmospheric air into the structure 12. The conduit arch 12 being comprised of a plurality of plug-welded corner angles and plates with interior corner welds covered by a silicon-like material provides means for increasing atmospheric pressure within the structure. Also shown, by direction arrow 20, are a plurality of high pressure air streams 20 being ejected through a plurality of swiveling forced air egress members 16 into the passageway 22 formed by the conduit arch 12. Each of the egress members 16 having connection means 24 to a motor 26 which swivels the forced air egress member 16.

Figure 3:
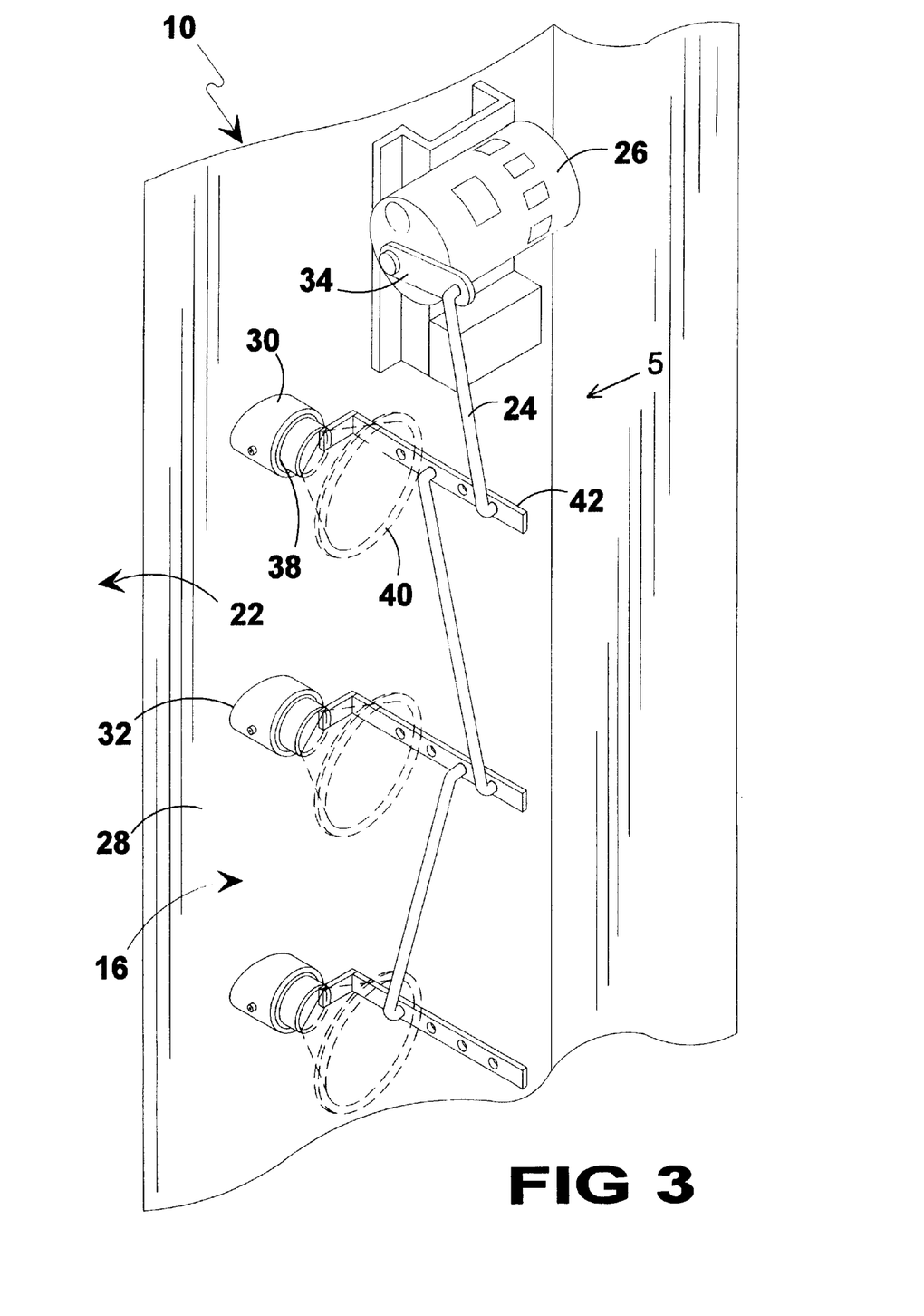
FIG. 3 is a perspective view of one of the stanchions of the present invention.

Turning to FIG. 3, shown therein is a perspective view of one of the stanchions 28 of the present invention 10. Shown are a plurality of swiveling forced air egress members 16 providing means for selectively directing a plurality of streams of high pressure air into the passageway 22 formed by the conduit arch. Each swiveling forced air egress member 16 is comprised of a tubular collar 30 welded over the structural egress apertures 32. Within each collar 30 is a ball-like socket sleeve 38 providing means for swiveling an air compression nozzle 40 which is affixed to the interior end of the ball-like socket sleeve. Also shown is the positionally fixed motor 26 within the conduit arch 12 providing means for pivoting 34 said forced air egress members 16. Means for connecting 24 the pivot arm 34 to an arm 42 connected to the base of egress member 16 is also shown.

Figure 4:
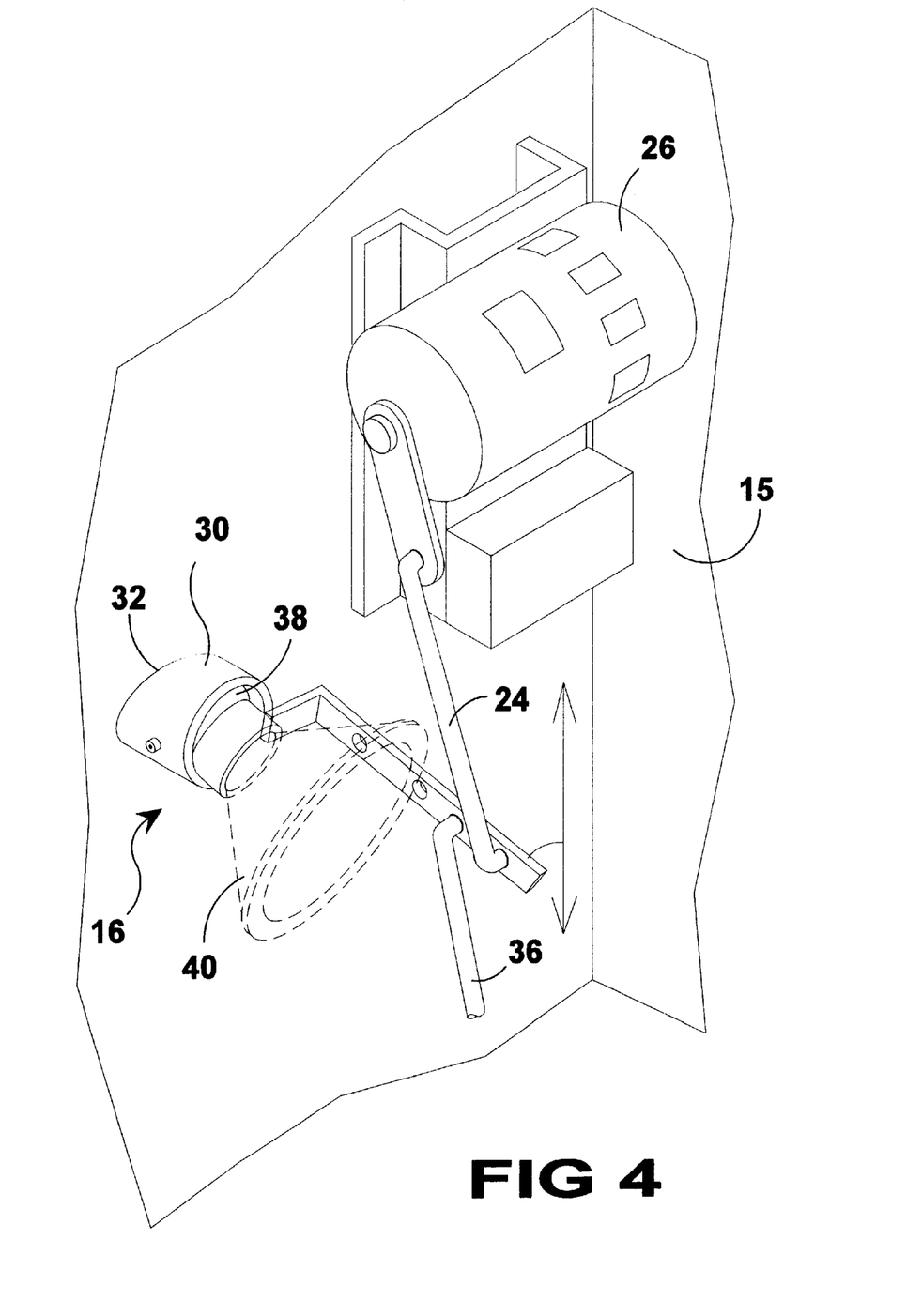
FIG. 4 is an enlarged view taken from FIG. 3 as indicated.

Turning to FIG. 4, shown therein is an enlarged view taken from FIG. 3 as indicated. Shown is a swiveling forced air egress member 16 within the conduit 15 formed by the conduit arch 12 having rod-like connection means 24 to a motor 26 which swivels the member 16. Also, said member has a second rod-like connection means 36 to another adjacent forced air egress member 16. The forced air egress member 16 is comprised of a tubular collar 30 welded over the conduit egress aperture 32. Within the collar 30 is a ball-like socket sleeve 38 having an air compression nozzle 40 affixed thereto whereby the pressurized air is further compressed and ejected into the passageway 22 formed by the conduit arch 12.

Figure 5:
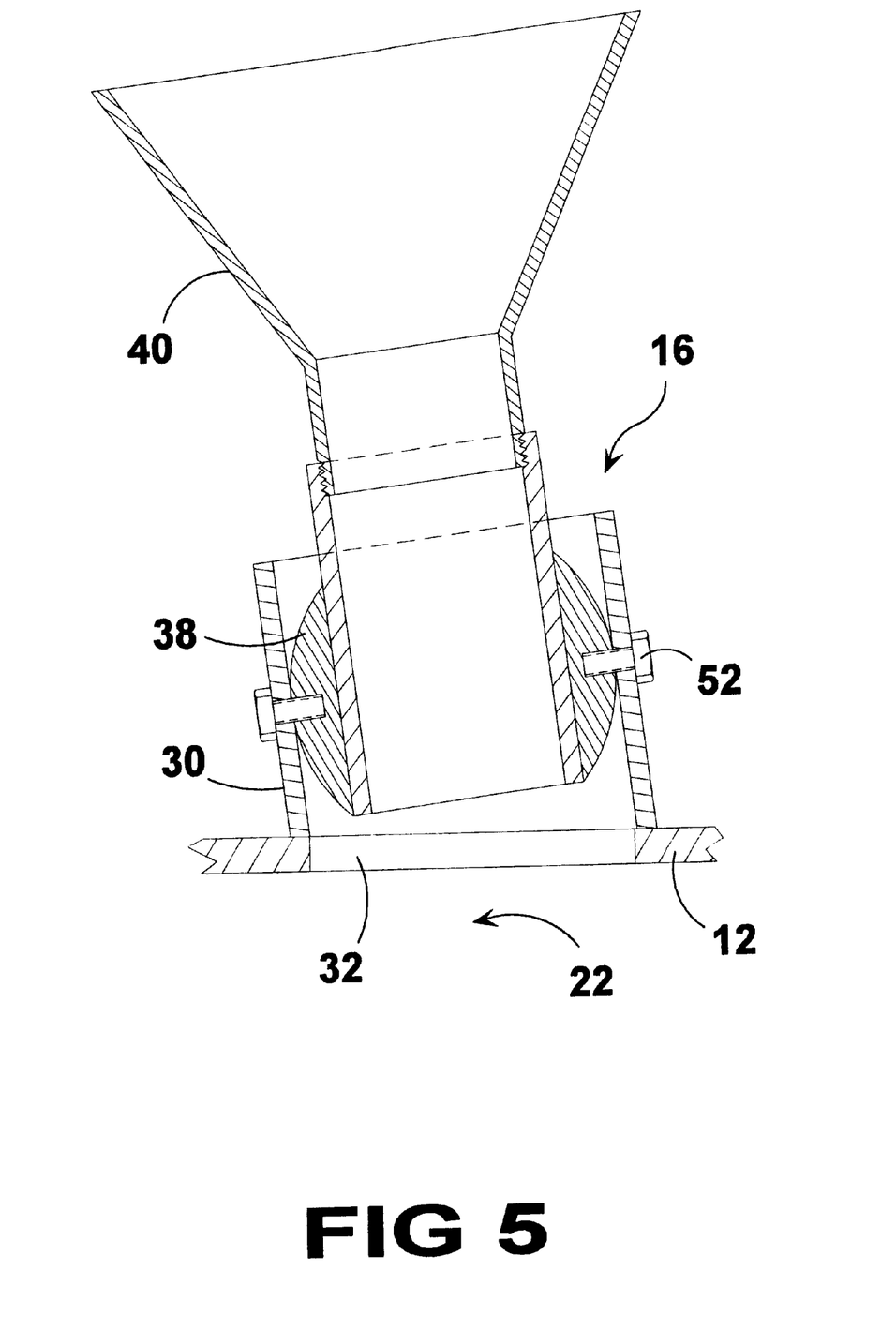
FIG. 5 is a sectional view, taken from FIG. 4 as indicated, shown is the components of the swiveling forced air egress member contained with a sleeve.

Turning to FIG. 5, shown therein is a sectional view, taken from FIG. 4 as indicated, shown are the components of the swiveling forced air egress member 16 contained within collar 30. The forced air egress member 16 is comprised of a tubular collar 30 welded over the conduit egress aperture 32. Within the collar 30 is a ball-like socket sleeve 38 having a compression nozzle 40 extending into the interior of the pressurized conduit wherethrough the compressed air is ejected into the vehicle passageway 22 formed by the conduit arch 12. Means 52 for connecting socket 38 to collar 30 are also shown.

Figure 6:
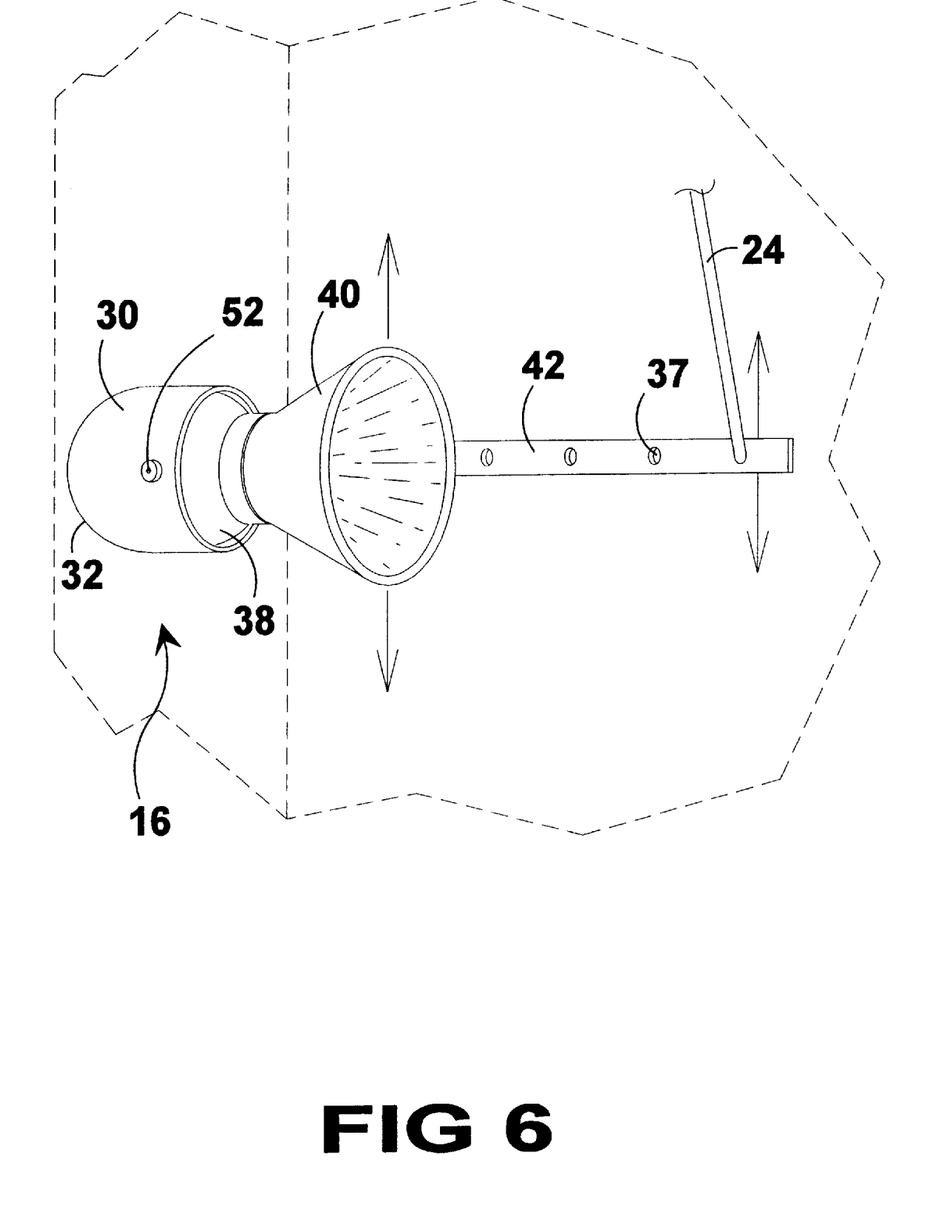
FIG. 6 shown is the complete forced air egress member comprised of a tubular collar welded over the conduit egress aperture.

Turning to FIG. 6, shown therein is the complete forced air egress member 16 comprised of a tubular collar 30 welded over the conduit egress aperture 32. Within the collar 30 is a ball-like socket sleeve 38 having an air compression nozzle 40 affixed thereto and extending into the interior of the pressurized conduit wherethrough the compressed air is ejected into the passageway 22 formed by the conduit arch 12. Affixed to the ball-like socket sleeve is a rigid arm member 42 having connection means 24 for attaching a driving member and having an aperture 37 for a second connection means for connecting to another complete forced air egress member 16.

Figure 7:
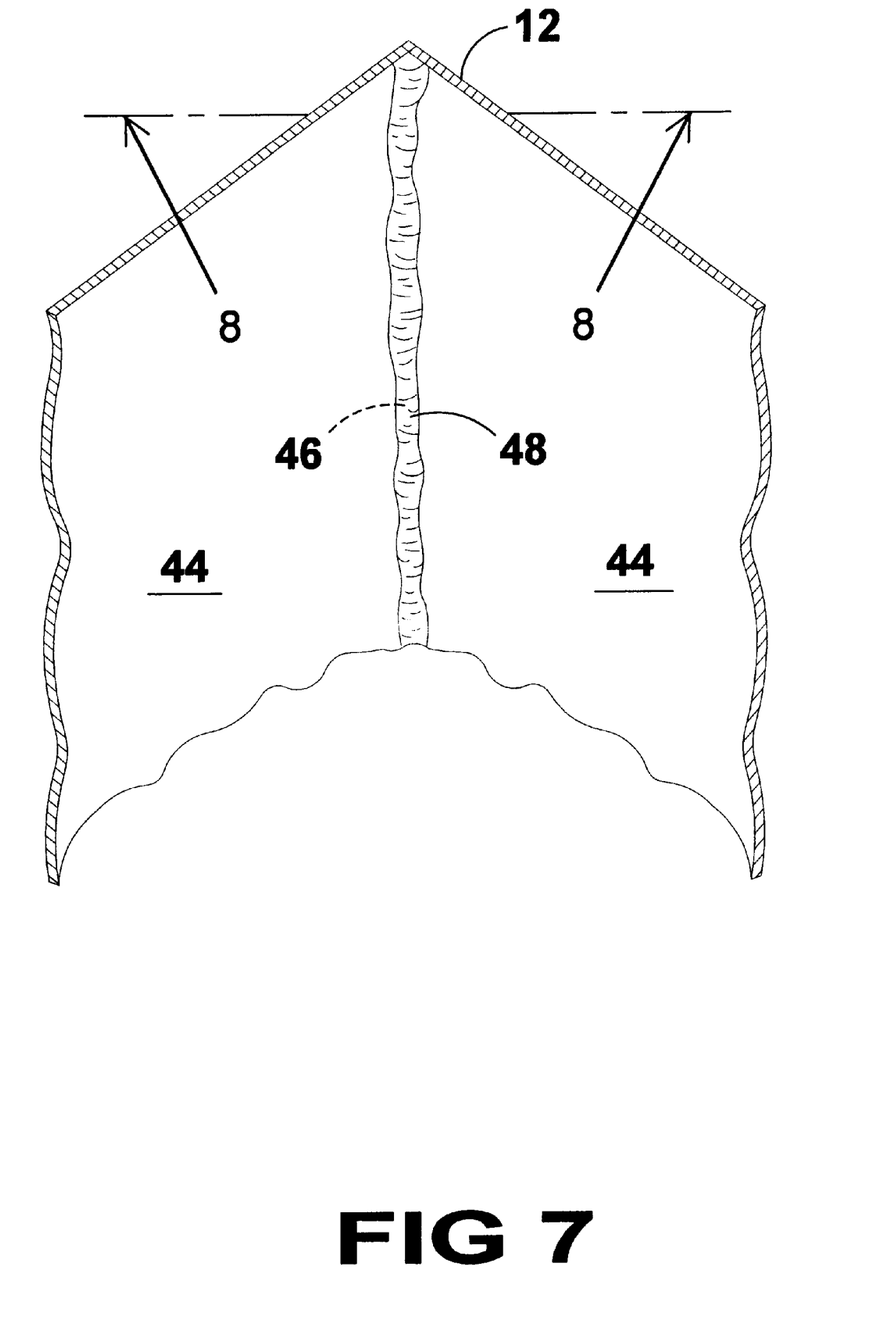
FIG. 7 is an interior sectional view of two of the plates forming the conduit arch. Shown is a weld having an amount of silicon covering the weld.

Turning to FIG. 7, shown therein is an interior sectional view of two of the plates 44 forming the conduit arch 12. Shown is a weld 46 having an amount of silicon 48 covering the weld.

Figure 8:
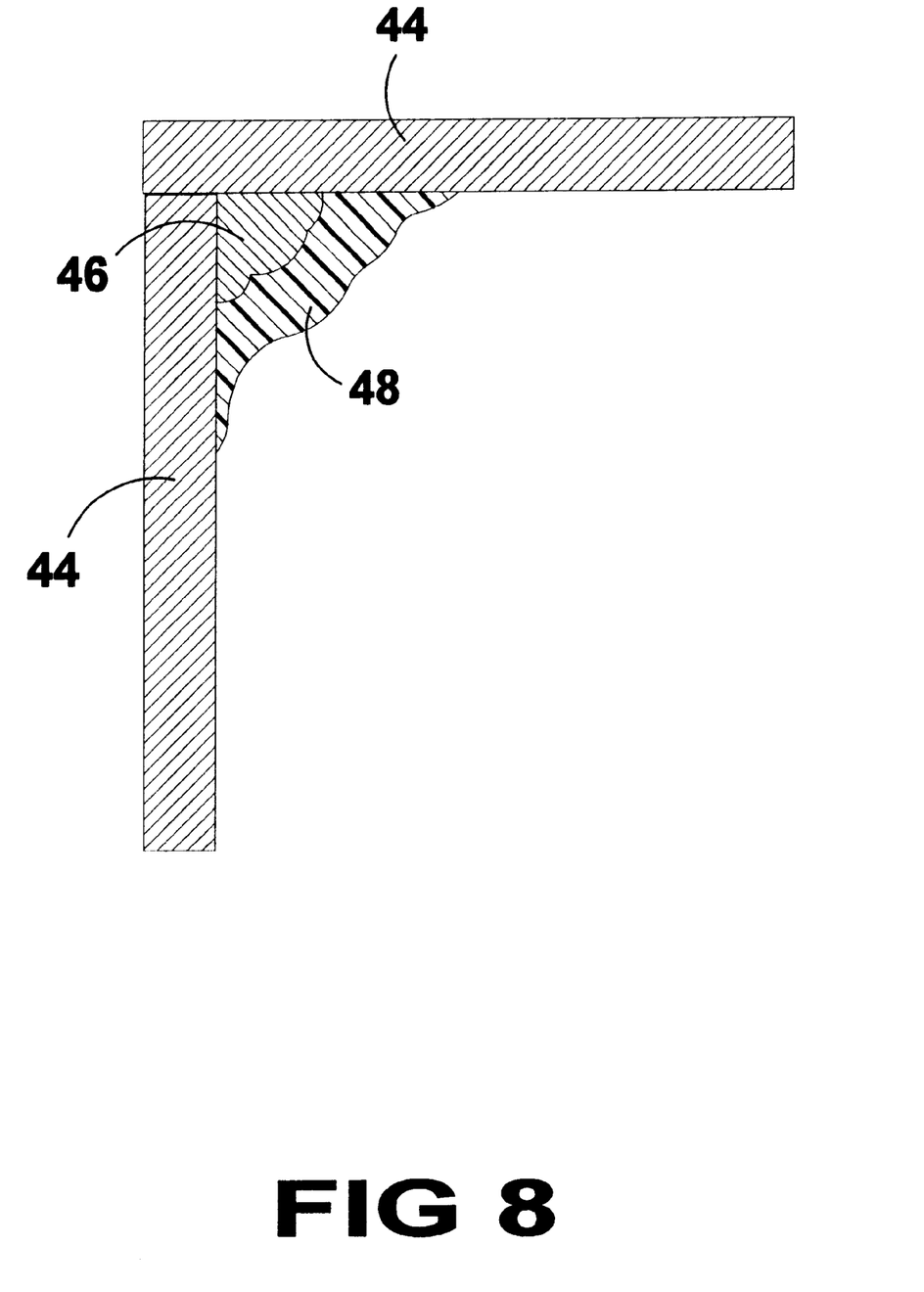
FIG. 8 is a cross sectional view, taken from FIG. 7 as indicated. Shown are two of the plate members being connected by weld and having an amount of silicon covering said weld.

Turning to FIG. 8, shown therein is a cross sectional view, taken from FIG. 7 as indicated. Shown are two of the plate members 44 being connected by weld 46 and having an amount of silicon 48 covering said weld.

Figure 9:
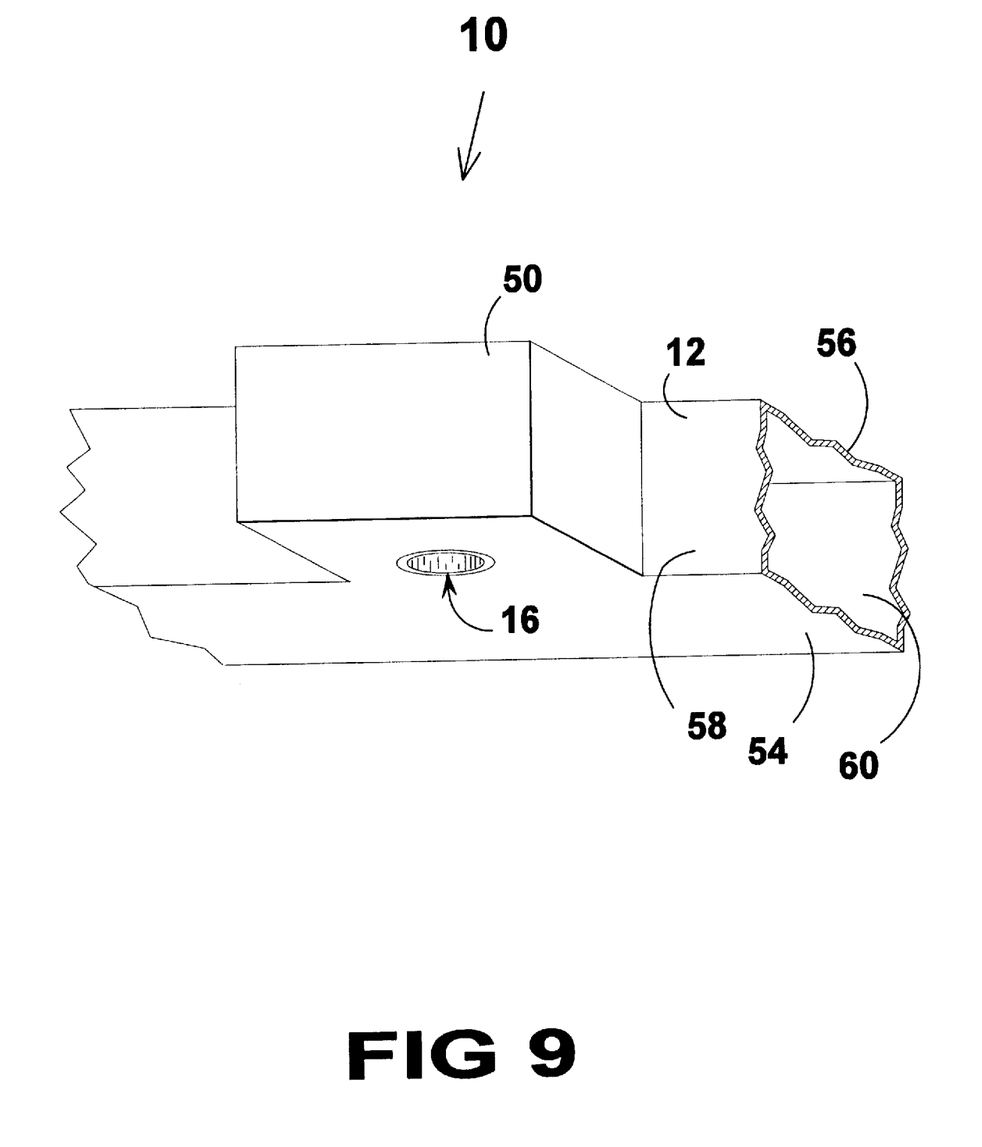
FIG. 9 is a partial sectional view of the overhead member having a centrally located forced air egress member.

Turning to FIG. 9, shown therein is a partial sectional view of the overhead member 50 having a centrally located forced air egress member 16. Also shown is the inner surface 54, outer surface 56, and two side surfaces 58 and 60 of conduit 12.

Figure 10:
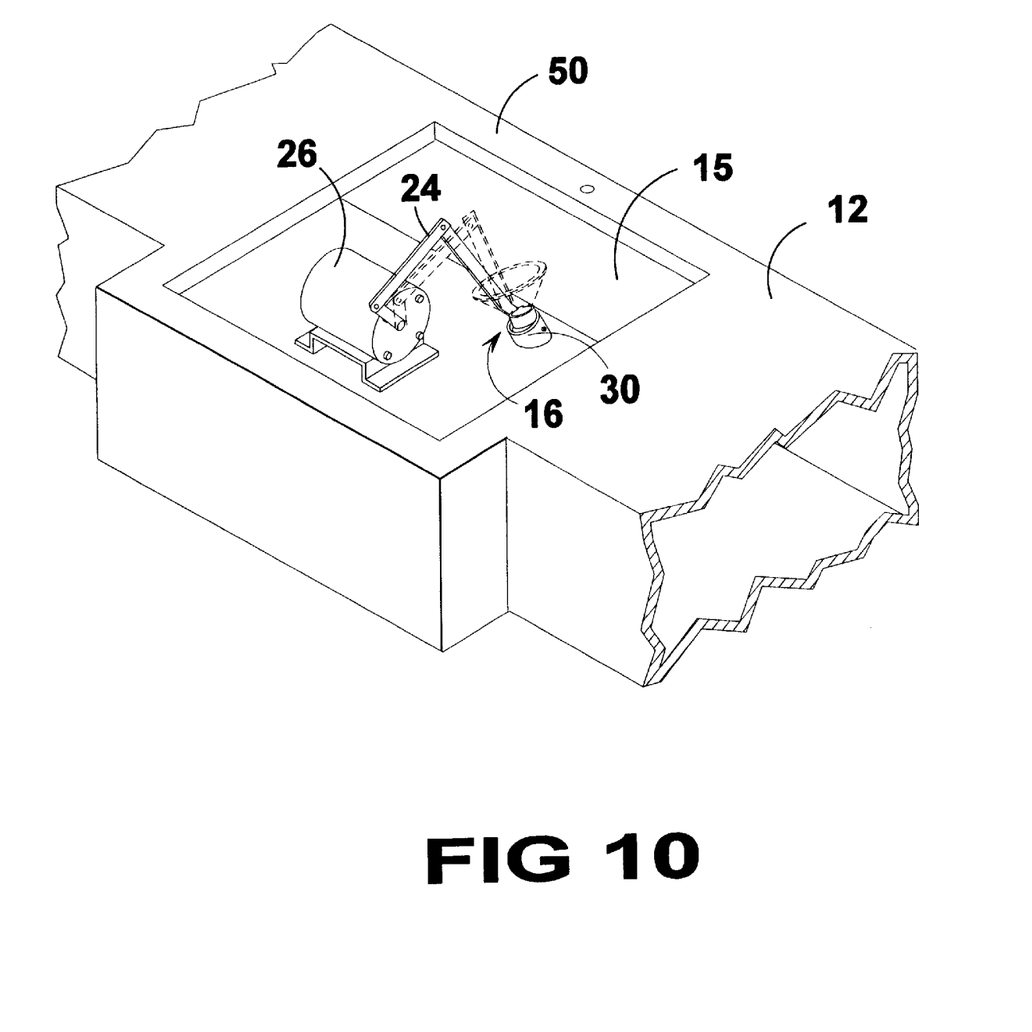
FIG. 10 is an enlarged view of the overhead swiveling forced air egress member within the passageway formed by the conduit arch having connection means to a motor which swivels said member.

Turning to FIG. 10, shown therein is an enlarged view of the overhead member 50 with swiveling forced air egress member 16 within the interior of conduit 15 formed by the conduit arch 12 having connection means 24 to a position motor 26 which swivels said member. The forced air egress member 16 is comprised of a tubular collar 30 welded over the conduit egress aperture. Within the collar 30 is a ball-like socket sleeve (not shown) having an air compression nozzle (not shown) extending into the interior of the pressurized unit and wherethrough the compressed air will be ejected into the vehicle passageway formed by the conduit arch 12. The ball-like socket further has connection means 24 to a motor 26 for swiveling said forced air egress members 16.

What is claimed to be new and desired to be protected by Letters Patent is set forth in the appended claims:

1. An apparatus for removing water from vehicles as the vehicle emerges from a car wash, comprising:
   a) a conduit defined by an inner surface, an outer surface and two side surfaces wherein said conduit forms an arched passageway through which a vehicle passes as the vehicle emerges from a car wash;
   b) a source of pressurized air which supplies pressurized air through said conduit with which to remove water from the vehicle;
   c) a plurality of air egress members having an aperture through which air is transmitted from said conduit wherein said plurality of air egress members are disposed in a spaced apart relationship on the inner surface of said conduit forming said arched passageway, air being transmitted through said plurality of air egress members toward the vehicle as the vehicle passes through said arched passageway;
   d) each of said air egress members comprising a stationary tubular collar surrounding said aperture extending within said conduit, a ball-like socket sleeve swivelly mounted within said tubular collar, and a funnel-like compression nozzle extending from said sleeve within said conduit; and
   e) means for pivoting said plurality of air egress members in unison for controlling the direction of air into said arched passageway comprising a rigid arm member extending from each sleeve, connectors joining adjacent rigid arm members, motor means having a first connector linked to an adjacent arm member for rotating a first of said plurality of air egress member attached to said first connector thereby causing all of said rigid arm members to rotate all of said plurality of air egress members in unison.

2. The apparatus of claim 1, said conduit further comprising a plurality of welded plates forming said inner, outer and two side surfaces and having a plurality of plug-welded corner angles within said conduit covered by silicon-like material.

3. The apparatus of claim 1, said source of pressured air being a blower driven by a motor.

* * * * *